Nov. 29, 1955     P. E. SÉVIN     2,725,007

CABIN PRESSURE CONTROL

Filed June 18, 1954     6 Sheets-Sheet 1

Inventor

Paul Etienne Sevin by Brown & Seward

Attorneys

United States Patent Office 2,725,007
Patented Nov. 29, 1955

2,725,007
CABIN PRESSURE CONTROL

Paul Etienne Sévin, Clamart, France, assignor to Societe Nationale de Constructions Aeronautiques du Sud-Ouest, Paris, France, a company of France Application June 18, 1954, Serial No. 437,803

Claims priority, application France June 25, 1953

11 Claims. (Cl. 98—1.5)

This invention relates to devices for controlling the pressure within an enclosure, such as an aircraft cabin.

The invention, more particularly, relates to pressure control devices of this type comprising balanced valving means to control escape of the air fed into the cabin by a supercharger or the like, said valving means being regulated by a device responsive to the differential between a pilot pressure and the pressure in the cabin.

An object of the invention is to provide a mechanism by means of which said pilot pressure and hence the cabin pressure is automatically and smoothly changed at a predetermined rate.

It is another object of the invention to provide means for adjusting said rate of change.

In known mechanisms of this type, the desired smooth change of the pilot pressure is obtained by means of a variometric device comprising a capillary tube or the like through which is passed air from and to a pressure control chamber.

It has been proposed, heretofore, to adjust the rate of flow through said capillary tube and hence the rate of change of the cabin pressure by varying directly a cross-section of the capillary tube, by means of a hand-controlled needle-valve or the like. This requires exceedingly accurate machining of the parts, due to the inherently minute size of the capillary tube. Moreover, this has the drawback that for a given position of the needle-valve, the rate of flow may have different values due to wear, oxidation, thermal expansion, penetration of dust and other phenomena which have considerable effects due to the minute size of the tube.

An object of the invention is to provide the required change of the rate of flow by varying the pressure differential between both ends of the capillary tube by adjusting the cross-section of a pipe having a comparatively substantial size which permits eliminating the problems of accuracy.

Another object of the invention is to effect the above-mentioned adjustment on a cross-section between both sides of which the pressure differential is a constant one, so that said adjustment does not depend on the pressure altitude of the cabin.

It is another object of the invention to provide a mechanism of the character described which is purely pneumatic in operation.

Still a further object of the invention is to provide a mechanism of the character described in which the sign of variation of the pressure in the cabin may be suddenly reversed without giving rise to a "jump" of pressure.

For these purposes, it is a more specific object of my invention to provide a pilot pressure controlling mechanism of the character described wherein said pressure control chamber is completed by two ancillary compartments, each having a common flexible partition with said chamber, said compartments being fed with air from the cabin through valves controlled by the combined action of the pressure differentials on either side of said partitions and equally but oppositely calibrated spring means, whereby the pressures in said compartments always differ from that in said chamber by equal and opposite amounts, wherein said compartments are interconnected by a pipe having two equally restricted throttlings and provided with a tap to adjust the rate of flow between said throttlings and wherein the usual capillary tube communicates at one end with said control chamber while its other end is selectively connected by means of a shifting device including hand-control means with a point of said pipe located on one side or the other of said tap between the latter and the corresponding throttling.

Now, most of the known pressure controls of this type are equipped with an aneroid system adapted to shift automatically the pilot pressure controlling mechanism into "constant pressure operation" when the cabin pressure altitude reaches a predetermined value; this is the so-called isobaric range of flight.

It is another object of the invention to provide a cabin pressure control of the same type, wherein said aneroid ensures said shifting action through a pneumatic control, so that its mechanical work is reduced to a minimum.

It is a further object of the invention to provide such a mechanism in which said aneroid further assumes a regulating function to hold pressure in the control chamber at a constant value during isobaric range of flight in spite of slight parasitic pressure variations upstream the aneroid.

A further object of the invention is to provide the pressure control mechanism with safety means to limit the difference between the external and cabin pressures.

It is a further object of the invention to provide a pressure control mechanism of the type described, wherein the pressure control chamber is absolutely tight, by reason of its special design according to which no movable part passes through its walls.

Still another object of the invention is to provide a mechanism of the above described character that is relatively simple in construction and reliable in operation.

It is a further object of the invention to provide, in a mechanism of the type described, means making it possible to check at the airport the good operation of the whole assembly and, in particular, the transmission of the pilot pressure to the regulating unit of the outlet valve.

Other objects and advantages of the invention will be apparent from the following detailed description, together with the accompanying drawings, submitted for purposes of illustration only and not intended to define the scope of the invention, reference being had for that purpose to the subjoined claims.

Figure 1:
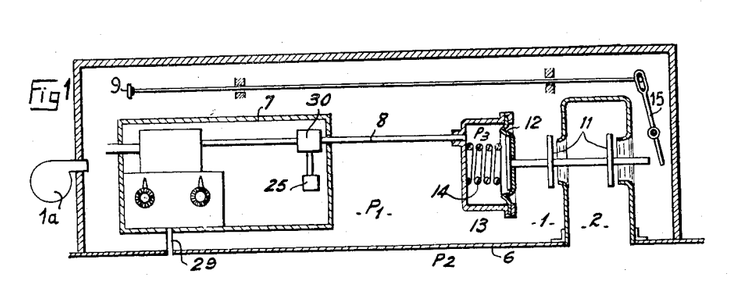
Fig. 1 is a general diagrammatical view of a system for controlling evacuation of compressed air from an enclosure.

In the general view of Fig. 1, there is shown at 11 a balanced valve equipped with two movable closing members of the same area fast with one another, said valve controlling the communication between an aircraft cabin 1 fed with compressed air by a supercharger 1a and the external atmosphere 2. $P_1$ is the cabin pressure and $P_2$ is the external pressure. Valve 11 is controlled by a regulating device comprising a diaphragm 12 tightly closing a casing 13, the inside pressure $P_3$ of which, or pilot pressure, is fed from a box 7 through a duct 8. A compression spring 14 is disposed inside casing 13 and tends to inflate diaphragm 12 outwardly for closing valve 11.

It will be easily understood that when the cabin pressure $P_1$ is higher than the pilot pressure $P_3$, the diaphragm 12 is depressed into the casing to open valve 11 to let air escape from the cabin 1. The external pressure $P_2$ will be assumed to be lower than the cabin pressure $P_1$. Now, if the pilot pressure $P_3$ is but slightly lower than the cabin pressure $P_1$, spring 14 holds the valve closed. Thus, the pilot pressure $P_3$ determines the cabin pressure $P_1$.

Due to the presence of spring 14, the cabin pressure $P_1$, in operation, is always higher than the pilot pressure $P_3$. More precisely, let $\Sigma$ be the area of the diaphragm 12 and F the strength of spring 14 at equilibrium; then:

$$P_1 = P_3 + \frac{F}{\Sigma}$$

since F is substantially constant, there may be written:

$$\frac{F}{\Sigma} = a$$

and $$P_1 = P_3 + a$$

The pilot pressure $P_3$ is determined by the control mechanism according to the invention, that is contained in box 7 and described in detail hereunder. Said box which communicates with the external atmosphere 2 through a duct 29 and further contains a safety valve 25 that permits limiting to a predetermined value the pressure differential between the cabin and outside and a gating box 30 that permits, inter alia, communication between the regulating unit 13 and the cabin. Furthermore, due to the presence of a mechanical hand-control, diagrammatically shown in the form of a lever 15 and a linkage provided with a push-button 9, the valve 11 may be opened manually.

Figure 2:
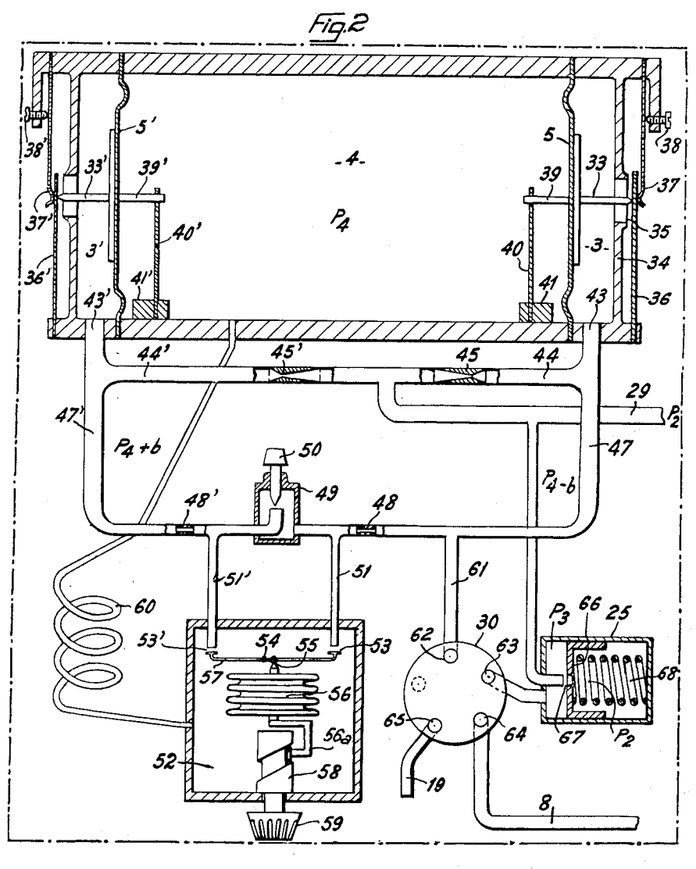
Fig. 2 is a diagrammatical view of a pilot pressure controlling mechanism according to the invention for such a system.

Fig. 2 is an enlarged view of box 7.

4 is a pressure control chamber the inside pressure of which constitutes a control pressure $P_4$. The chamber 4 is rigorously tight, due to the fact that no movable part passes through its walls. The control pressure $P_4$ acts on one side of flexible diaphragms 5 and 5' constituting deformable partitions separating chamber 4 from ancillary compartments 3 and 3'.

Since said compartments are alike, it will be sufficient to describe in detail the right-hand compartment 3 of Fig. 2. Said compartment is comprised between the diaphragm 5 and a rigid wall 34 provided with an opening 35 through which passes freely a stem 33 fast with the central rigidified portion of diaphragm 5.

The edges of the opening 35 that provides communication between the compartment 3 and the cabin (pressure $P_1$) are bevelled into a rim constituting a valve seat. A valve movable member, that, in the example shown, is merely constituted by a flexible strip 36, is urged towards the seat 35 by a leaf spring 37. The strength of the latter is adjustable by means of a screw 38. On its side located in chamber 4, the diaphragm 5 is fast with a stem 39 aligned with stem 33 and secured at one end to the center of the diaphragm and at its other end on another flexible strip 40. The latter is implanted in a support 41 fixed on a rigid wall of chamber 4 but, before being implanted into support 41, it has been slightly bent so that, once secured, it is capable of exerting through stem 39 a stress tending to deform diaphragm 5 outwardly, said stress adding its action to that of pressure $P_4$.

With this arrangement, if the pressures in chamber 4 and compartment 3 were equal to each other, the whole assembly comprising the movable members 40, 39, 5, 33 and 36 would seat strip 36 on opening 35, so as to close it.

Compartment 3 communicates with the external atmosphere through an outlet 43, a pipe 44 provided with a calibrated nozzle 45 and a pipe 29.

The operation of the elements which have been just described and the function of which is to determine the pressure in compartment 3 is as follows:

As will be seen later, in operation, the inlet 35 always remains slightly opened so that air from the cabin enters compartment 3 and escapes through outlet 43 and the nozzle 45 that limits its rate of discharge. If the position of strip 36 were such that opening 35 be completely opened, the pressure in compartment 3 would be substantially equal to $P_1$ that, normally, as described hereunder, is higher than $P_4$. In these conditions, the diaphragm 5 is sucked into chamber 4 and strip 36 partly closes opening 35. Since the air from the cabin has more difficulty entering into compartment 3, while the resistance to its escape has remained the same, the pressure in compartment 3 drops and diaphragm 5 is deformed outwardly, and so on, until, finally, said diaphragm 5 assumes a position of equilibrium.

Said position of equilibrium is obtained when the difference between the pressure $P_3$ (in compartment 3) and $P_4$ exactly balances the combined action of the resilient members 36, 37 and 40.

Hence, for said position of equilibrium, there may be written:

$$P_3 = P_4 - b$$

b (resultant of the resilient actions) being substantially constant for a given position of screw 38. Pressure $P_3$, that constitutes the above-mentioned pilot pressure is fed through pipes 44, 47, 61 and 8 into the regulating unit 13.

On the left-hand side of chamber 4 (as shown in Fig. 2), the pressure $P_4$ acts upon a second assembly similar to that described above and comprising a diaphragm 5', a leaf spring 37', elastic strips 40' and 36', the latter of which constitutes a valve closing member, stems 39' and 33' and an adjusting screw 38'. The compartment 3' communicates with the cabin through an inlet controlled by strip 36' and with outside through an outlet 43', a pipe 44' provided with a nozzle 45' and pipe 29. In this second assembly, the screw 38' is so adjusted that the elastic members tend to open the inlet 35' for equal pressures in 3 and 4 and that the difference between $P'_3$ and $P_4$ is equal and opposite to the difference between $P_4$ and $P_3$.

In other words, the screws 38 and 38' are respectively so adjusted that:

$$P_3 = P_4 - b$$
$$P'_3 = P_4 + b$$

Thus, the diaphragms 5 and 5' and the opposite forces of the elastic members associated therewith determine two pressures, in the ancillary compartments 3 and 3', "symmetrically" differing from pressure $P_4$.

An interaction between pressures $P_3$ and $P'_3$ is obtained by interconnecting pipes 47 and 47' through equally calibrated throttlings 48 and 48', respectively, between which is interposed a tap 49. A duct 51 picks up the pressure between the tap 49 and the throttling 48. Similarly, another duct 51' picks up the pressure between tap 49 and the other throttling 48'. When the tap 49, which is provided with a handle 50, is closed, the flow of air therethrough is interrupted so that the duct 51 is at pressure $P_4-b$, while the duct 51' is at pressure $P_4+b$.

When the tap 49 is completely opened, its resistance to the air flow is negligible as compared with those of the throttlings 48 and 48'. An air flow then circulates from the compartment 3' to the junction of pipes 47 and 44 and, hence, outside. Since the throttlings 48 and 48' are alike, they give rise to the same loss of pressure when air is passed through them and the ducts 51 and 51' are at a same pressure which is average between $P_3$ and $P'_3$, i. e. exactly at pressure $P_4$.

If, now, tap 49 is progressively closed, an additional resistance to the air flow is created, so that the rate of said air flow is progressively reduced. The throttlings 48 and 48' further give rise to equal but less important losses of pressure, while an additional loss of pressure appears in tap 49.

As a result, the ducts 51' and 51 are now respectively at pressures $P_4+\lambda b$ and $P_4-\lambda b$, the coefficient $\lambda$, comprised between 0 and 1, being determined by the degree of closure of the tap 49.

There are thus obtained two pressures "symmetrically" differing from pressure $P_4$ by as small an amount as desired.

Thus, if the pressure control chamber 4 were directly interconnected with the duct 51 through a capillary tube, air would flow from said chamber through said capillary tube into said duct and said flow could be made as slow as desired, due to the presence of tap 49. The pressure $P_4$ would then slowly drop at a rate adjustable by means of said tap. Conversely, if such a capillary tube were interconnected with the duct 51' instead of duct 51, an air flow would take place from the duct 51' into chamber 4, so that pressure $P_4$ would increase with a rate as slow as desired under the control of tap 49. Finally, if said capillary tube were simultaneously connected with both (or neither) ducts, no air flow would take place through said tube and pressure $P_4$ would remain constant. Decrease of pressure $P_4$ causes those of pressures $P_3$ and hence $P_1$ and corresponds to "ascent" of the cabin. Increase of pressure $P_4$ corresponds to "descent" of said cabin and constancy of pressure $P_4$ corresponds to isobaric range of flight.

In order to permit manual "switching" between the two first conditions and automatic switching to the third one, both ducts 51 and 51' are directly connected with a switching chamber 52 through openings 53 and 53'. A tilting arm 57 pivoted on a fixed fulcrum 54 may be seated selectively on 53 or on 53'. Said tilting arm is articulated at 55 with an aneroid 56, the reference abutment of which may be adjusted by means of a device diagrammatically shown in the shape of a cam-follower 56a, a helical slope 58 and a hand-control knob 59.

Finally, the pressure control chamber 4 and the switching chamber 52 are interconnected through a capillary tube 60. To regulate the operation of valve 11 of Fig. 1, the pressure in pipe 47, i. e. pressure $P_3$, is fed into the regulating unit 13 through duct 8. Pressure $P_1$, which equals $P_3+a=P_4+(a-b)$, thus eventually follows the variations of pressure $P_4$.

Let us assume, for example, that a progressive drop of the cabin pressure is to be first obtained (fictive ascent) to be followed by a period of stabilized pressure, the so-called isobaric range of flight. Handle 50 of tap 49 is first adjusted to adjust the speed of the required fictive ascent, whereupon knob 59 is adjusted to determine the fictive altitude of the isobaric range of flight. If knob 59 is rotated clockwise, the reference abutment of aneroid 56 is lowered (in the drawing) and arm 57 is tilted clockwise which obturates duct 51' (pressure $P_4+\lambda b$), while completely opening the duct 51 (pressure $P_4-\lambda b$). Air then flows in the capillary tube from chamber 4 into chamber 52 with a rate of flow which is a function of $\lambda$ i. e. of the adjustment of the handle 50 of tap 49, $P_4$ and hence $P_4-\lambda b$ decrease and the aneroid 56 progressively expands. When pressure $P_4-\lambda b$ has reached a predetermined value, the aneroid 56 presses upon the tilting arm 57, thus opening duct 51', while tending to close duct 51. The pressure in chamber 52 progressively builds-up from the value $P_4-\lambda b$ until it reaches value $P_4$, for which the aid flow in the capillary tube 60 in interrupted.

It may be easily understood that the pressure $P_4$ will be rigorously stabilized by the aneroid 56 which, through the action of the tilting arm, maintains a constant pressure in chamber 52.

Conversely, in order to cause a progressive increase of the cabin pressure (fictive descent), knob 59 is rotated anti-clockwise in order to lift the abutment of the aneroid 56; duct 51 is obturated and duct 51' is completely opened. The pressure in chamber 52 is now equal to $P_4+\lambda b$ and air flows in the capillary tube from chamber 52 into chamber 4. $P_4$ and hence $P+\lambda b$ increase, the aneroid 56 is compressed until the tilting arm 57 is equalibrated again.

The degree of closure of the tap 49 by its handle 50 thus actually determines the rate of variation of pressure $P_4$ i. e. the speed of fictive ascent or descent of the cabin, while the selection of the position of the aneroid 56 by means of knob 59 determines the level of pressure that will be maintained steady, i. e. the cabin altitude for the isobaric range of flight.

As compared with existing variometric control devices, the pilot pressure controlling mechanism according to the invention offers the following advantages:

The pressure in chamber 52 that governs the air flow through the capillary tube 60 is not directly adjusted by means of diaphragms and valving capable of causing parasitic effects due to defects of such movable elements (rigidity of the diaphragms, friction of the movable members, ageing of the springs). Only the pressures in compartments 3 and 3' are adjusted in this manner. Moreover, on the one hand, the design of the adjusting means (diaphragm 5, flexible strips 36, 40, leaf spring 37, etc.) is extremely simplified and, on the other hand, said adjustment undergoes no variations, so that the pressure differential $b$ remains substantially constant.

Furthermore, said differential $b$ may be adjusted at a comparatively elevated value (e. g. 10 g./cm.$^2$). Assuming that parasitic effects give errors of $\pm 1$ g./cm.$^2$, the value of $b$ is then defined to 10%, more or less.

Now, the tap 49 that "modulates" the rate of flow is, once adjusted, a purely static apparatus; it introduces practically no additional parasitic effect so that the reduced pressure differential $\lambda b$ will remain defined to 10% more or less, which would not be the case if said reduced differential were defined directly by movable members. It is therefore possible to obtain extremely small pressure differentials with a good accuracy which permits: reducing the capacity of chamber 4; using a comparatively thick capillary tube 60, which reduces the risks of obturation by water droplets, dust, and so on.

The second advantage is that the work required from the aneroid 56 is extremely low power.

In the known devices, such an aneroid must directly adjust, during isobaric range of flight periods, the strength of a spring, that determines in turn the rate of flow in an enclosure communicating with the pressure control chamber; the air flow thus adjusted is a very strong one. On the contrary, according to the invention, though the air flow through the inlets of the compartments 3, 3' is a comparatively strong one, the flow of air through the tap 49 is far more reduced, while that passing through ducts 51 and 51' is still far weaker. Thus, the work required from the aneroid 56 is limited to a very small effort so that, generally, it will not be necessary to use a plurality of aneroids to obtain the required adjusting power.

This may be taken advantage of: either for reducing the size of chamber 52, or for increasing the regulating energy fed from pipe 8 to valve 11. In these conditions, the control mechanism according to the invention may be used for actuating several valves and it may be adapted for use on board very big airplanes.

As shown in Fig. 2, box 7 further contains a safety device 25 and a gating system 30. The latter makes it possible to realize several combinations of air circuits. It comprises a base provided with four openings 62, 63, 64, 65.

Opening 62 communicates with a pipe 61 connected to the tube 47 (pressure $P_3$).

Opening 64 communicates with the tube 8, that ensures feeding of the pressure $P_3$ into the regulating unit 13 of valve 11.

Opening 65 communicates with a tube 19 leading to the cabin.

Opening 63 is interconnected with the limiting valve 25 on the outer side of a movable member 66 piston or flexible diaphragm, provided with a hole 67 connecting its inner side with the exhaust duct 29.

The outer pressure $P_2$ is thus transmitted to the inner side of the movable member, 66, which is urged outwardly by a spring 68.

For a predetermined value of the pressure differential $P_3 - P_2$, piston 66 is lifted off against the action of spring 68 and the air incoming from the valving system 30 flows outwardly, which limits pressure $P_3$. Thus, the difference $P_3 - P_2$ is limited as well as the difference $P_1 - P_2$ which protects the cabin against any risk of blowing up due to excessive overpressure.

Figure 14:
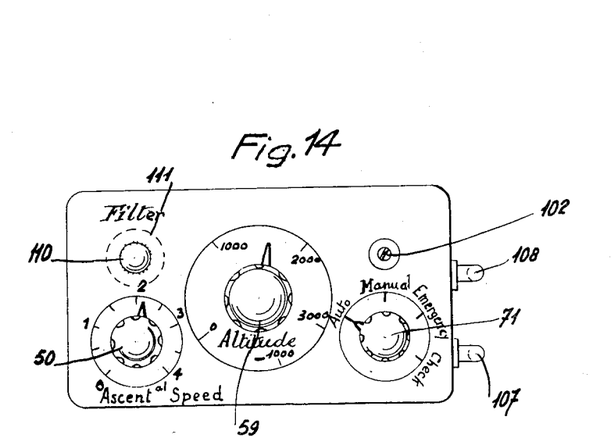
Fig. 14 is a reduced front view taken from line XIV—XIV of Fig. 13

The valving system 30 (cf. Fig. 11) comprises a selector valve or shutter adapted to obturate selectively certain combinations of the openings 62 to 65, said selector valve or shutter being controlled by a knob 71 (cf. Fig. 14).

In the "automatic control" position, only opening 65 is obturated. The pressure $P_3$, fed from tube 61, is thus transmitted to pipe 8, the limiting valve 25 preventing, as indicated above, said pressure $P_3$ from becoming prohibitively strong.

In the "hand-control" position, the opening 65 is open, while the opening 62 is closed. Pressure $P_1$ now builds-up in tube 8 as well as in casing 13 of Fig. 1. As described with reference to Fig. 1, the balanced valve 11 may be now manually operated against only the action of spring 14. It is thus possible to adjust manually the pressure in the cabin.

In the "emergency position" of knob 71, both openings 62 and 63 are obturated. It is still possible to act manually upon valve 11, but the limiting valve 25 is bypassed. This is an additional safety for the case of failure of valve 25 (e. g. when spring 68 is broken), which failure would result in a drop of pressure in the valving system 30 and tube 8, causing full opening of valve 11.

Finally, the valving system 30 is also provided with a fourth "checking" position, in which the opening 64 is obturated. This position is used for checking the tightness of tube 8 and the regulating unit.

Figs. 3 to 12 show various embodiments of the elements contained in box 7. In these figures said elements have been numbered in the same manner as in Fig. 2.

Figure 13:
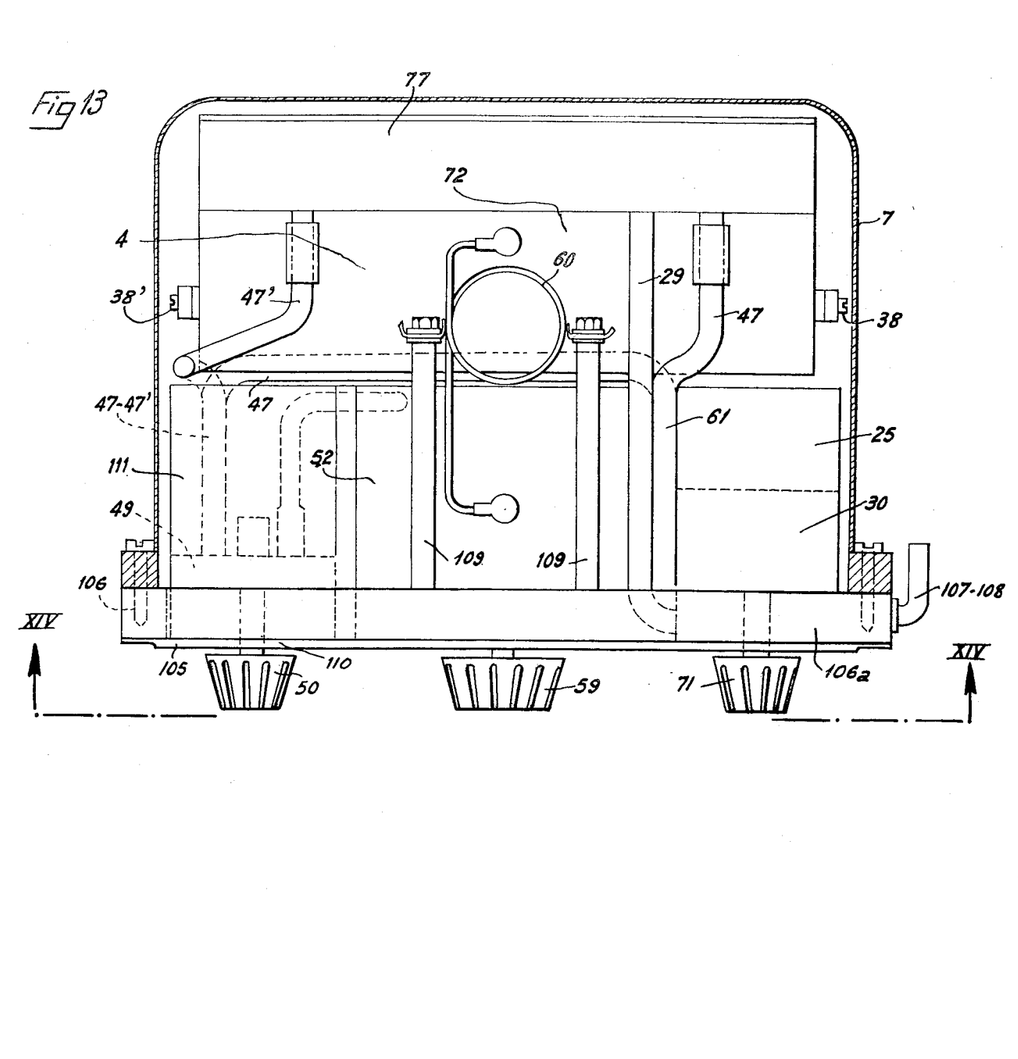
Fig. 13 is a general plane view of a pilot pressure control box containing all the elements of Figs. 3 to 12.

Finally, Figs. 13 and 14 show in which manner said elements may be assembled in a box in a compact arrangement.

Figure 3:
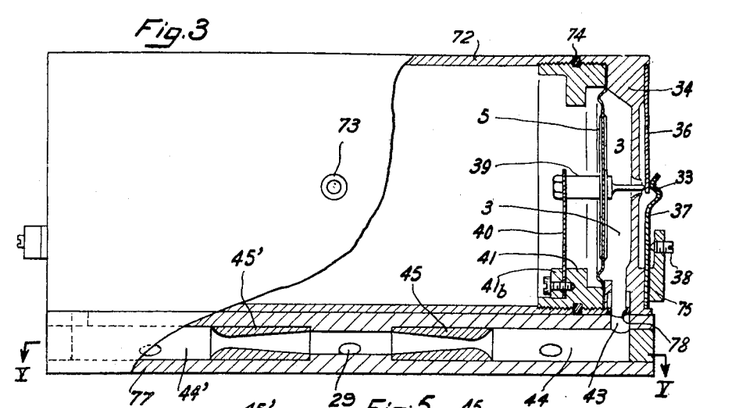
Fig. 3 is an elevational, partly sectional view, with parts broken away, of a practical embodiment of the pressure control chamber and its two ancillary compartments.
Figures 4, 5, 6, 7:
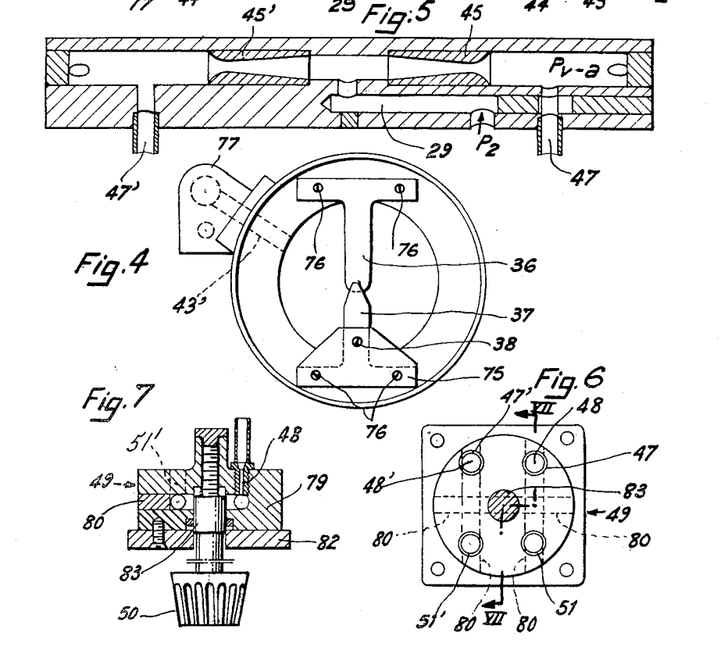
Fig. 4 is an end view of Fig. 3.
Fig. 5 is a sectional view along line V—V of Fig. 3.
Fig. 6 is a plan view of the tap interposed in the interconnection between the ancillary compartments.
Fig. 7 is a sectional view along line VII—VII of Fig. 6.

The variometric assembly is shown in detail in Figs. 3, 4 and 5. The chamber 4 is constituted by a cylinder 72 threaded at both ends and carrying a union 73 on which is branched the capillary tube 60. The diaphragm 5 has its edge clamped between a threaded ring 41 (screwed in tube 72) and a nut 34 screwed on said ring. Said nut is hollowed to form the compartment 3. A seal 74 is provided to ensure tightness of the whole assembly. Otherwise, the various parts are designed and arranged as shown in Fig. 2. The other compartment 3' is formed in a similar manner at the other end of tube 72.

Fig. 4 is an elevation of the flexible strip 36 and the leaf spring 37, furthermore showing the adjusting screw 38 and its support 75.

Said support, strip and spring are secured on nut 34 by means of screws 76. The outlets 43 and 43' of the compartments 3 and 3' lead to an insert 77, fast with cylinder 72 and which is provided with passages 44, 44'. In said passages are fitted tubes forming the nozzles 45 and 45'. The latter are, preferably, given the shape of "venturi" which ensures an air flow which is both more uniform and more easily responsive to the pressure differential $P_3 - P_2$.

Additional bores (Fig. 5) constitute portions of the passages 29, 47 and 47', respectively provided for feeding the external pressure $P_2$ between the venturis 45 and 45' and for collecting pressures $P_3$ and $P'_3$.

Seals 78 and 78' are interposed to avoid leakages between the insert part 77 and the cylinder 72.

Figs. 6 and 7 illustrate an embodiment of the "modulating" tap 49.

Said tap is constituted by a block 79 which is provided with three passages obturated at both ends by plugs 80, said passages being disposed in the same plane in an H-like configurations. Each one of those passages which constitute the vertical arms of the H communicates at both ends with bores in part 79 right-angled with them and one of which is provided with a calibrated mouth-piece (throttlings 48 and 48'), while the other one is fitted with a normal mouth-piece (origins of the passages 51 and 51'). At the center of part 79, is screwed the valve barrel 83 of tap 49 which obturates more or less completely the communication between the above-mentioned vertical passages of the H-like network.

Figures 8, 9, 10, 11, 12:
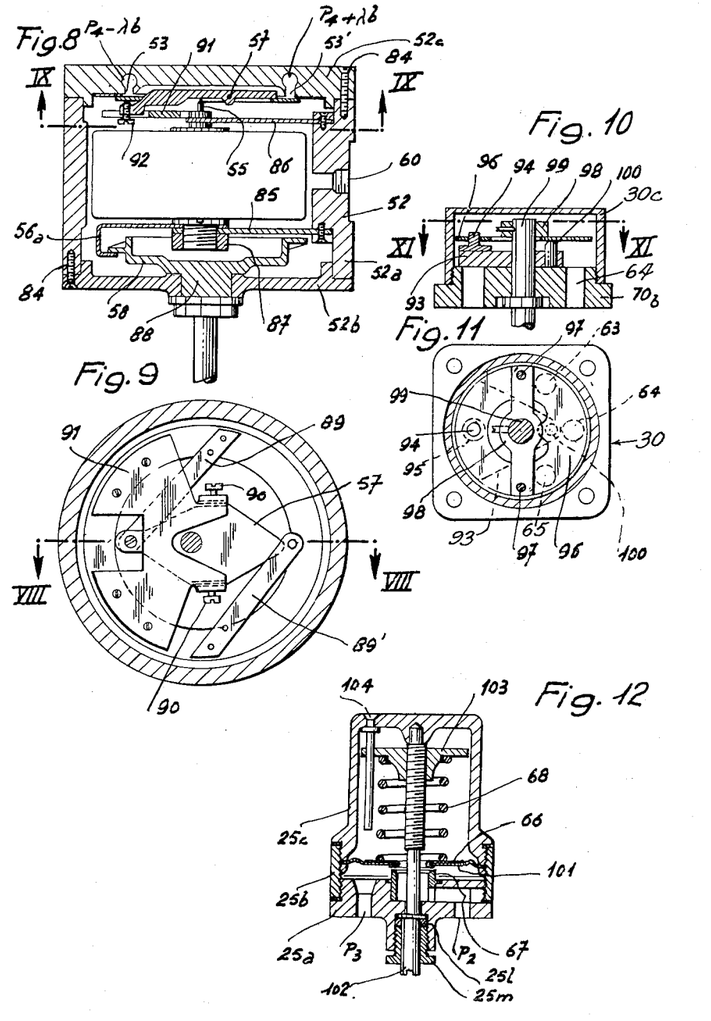
Fig. 8 is an axial sectional view of the altitude control chamber along line VIII—VIII of Fig. 9.
Fig. 9 is a diametral sectional view along line IX—IX of Fig. 8.
Fig. 10 is an axial sectional view of manually actuated gating means for controlling the operation of the mechanism according to the invention.
Fig. 11 is a diametral sectional view along line XI—XI of Fig. 10.
Fig. 12 is an axial sectional view of a safety valve incorporated in the device according to the invention.

The switching chamber 52 is shown in Figs. 8 and 9. Said chamber comprises three parts, viz., a body 52$a$ closed at both ends by heads 52$b$ and 52$c$, assembled together by means of screws 84. In body 52$a$ is housed the aneroid 56 which is mounted on two flexible leaves, 85 and 86. A stirrup member 56$a$ is secured on leaf 85 together with the base of the aneroid by a nut 87; a needle 55 secures the other end of the aneroid on leaf 86.

In the head 52$b$ is journalled a hub 88 carrying the helical slope 58. Said hub is controlled by a knob 59 keyed thereon.

On the other head 52$c$ are bored passages 51 and 51' leading into chamber 52 through openings 53 and 53' formed as valve seats. Said head also carries (Fig. 9):

(a) Two spring leaves 89 and 89' acting as valve closing members. Leaf 89' (that obturates tube 51' at pressure $P_4 + \lambda b$) is somewhat bent so that it tends to seat on opening 53'. On the contrary, the other leaf 89 tends to be slightly lifted off opening 53.

(b) The tilting arm 57, which is articulated on two needle screws 90, carried by the inserted support 91. Said tilting arm 57 is provided with an adjusting screw 92. It is so disposed that the needle 55, fast with the aneroid 56, when pressed upon lever 57 lifts leaf 89' off opening 53' while seating leaf 89 on opening 53. This arrangement permits avoiding a two-way interconnection between the tilting arm 57 and needle 55.

Figs. 10 and 11 are sectional views of the four-position gating system 30.

As described above, said system comprises a base 70$b$, provided with four openings 62 to 65 communicating with the various tubes, as shown in Fig. 2. The upper portion of said base is accurately machined and finished, as well as the selector valve or shutter 93 which has the shape of a segment and which cooperates with the upper face of said base to obturate selectively one or two of the openings 62 to 65. The shutter 93 carries a pin 94 which is engaged in a bore 95 of a flexible washer-shaped elastic member 96. Said washer-shaped member is secured by means of screws 97 to a cross-brace 98 which is keyed on shaft 99 of the shutter, so that when said shaft is rotated, the washer and the shutter are driven therewith. Moreover, the shutter is provided with a bore in which is housed a push-rod 100. The washer-like member 96 is provided with an embossing 96a through which it also bears on the push-rod 100. The bearing of the washer-like member 96 on pin 94 results in a good contact between the shutter 93 and the base. The bearing on the push-rod 100 permits identifying and locating the positions given to the shutter, due to notches provided at suitable points in the base to receive the tip of the push-rod. A screwed cover 30c ensures tightness of the gating system 30.

A sectional view of the limiting valve 25 is shown in Fig. 12.

Said valve comprises a base 25a, provided with two holes fed with pressures $P_3$ and $P_2$. Through bores in said base, pressure $P_2$ is fed to the center of a valve seat 67. A union ring 25b and a cap 25c screwed together secure the diaphragm 66, the central portion of which is rigidified by means of a cup-like member 101 provided with a central bore. The space comprised between the base, the ring and the diaphragm is tight, since said diaphragm 66—101 is pressed upon seat 67 by a spring 68. Through the central bore of the cup-shaped member 101, pressure $P_2$ builds-up on the upper face of the diaphragm, while the major portion of the lower face of the latter is acted upon by pressure $P_3$. As explained above, for a sufficiently large pressure differential $P_3-P_2$, air flows outwardly.

The force exerted by spring 68 is adjusted by means of a screw 102 which passes through the base 25c within a stuffing box; said screw displaces the abutment part 103 of the spring axially, since said part is prevented from rotating, due to the presence of a rod 104 which is engaged in a notch in the edge of said abutment part.

The various elements which have been just described may be assembled together into a compact arrangement, as shown in Figs. 13 and 14.

In Fig. 13, the "modulating" tap 49, the "switching" chamber 52, and the gating system 30 associated with the limiting valve 25 are directly secured in a juxtaposed relation on a general support comprising a plate 105 and a chassis base 106. In the right-hand portion 106a of said base, which carries the gating system 30 and the limiting valve, are bored passages to suitably interconnect the various elemenst. Two ends of these bores are fitted with the mouth-pieces 107 and 108 ensuring communication with the external atmosphere (duct 29) and with the regulating unit 13 (duct 8); the variometric device is also supported by the above-mentioned general support through columns 109. The whole assembly is enclosed in the box 7 (which has been shown sectioned in Fig. 13).

The air from the cabin, that ensures feeding of the compartments 3 and 3' and pipe 19 (Fig. 2), enters through a hole 110 and is purified in a filter 111. Said filter leads into box 7 and is also secured on the already mentioned general support.

Fig. 14 (front view of the apparatus) furthermore indicates the markings and graduations to be read on the apparatus.

Figure 15:
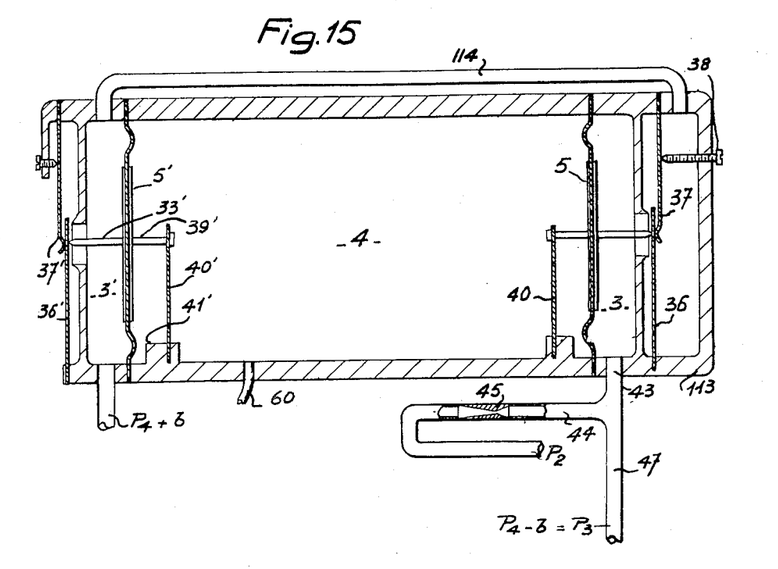
Fig. 15 is a diagrammatical sectional view of an alternative construction of the tight pressure control chamber and the ancillary compartments.

In the assembly described above, the two compartments 3 and 3' are fed separately with air from the cabin. It is also possible, as shown in Fig. 15, to feed both compartments in series, so as to obtain successively pressures $P_4+b$ and $P_4-b$. In the figure which shows an alternative embodiment of the upper portion of Fig. 2, the air from the cabin enters into the compartment 3' through an opening 35' to be depressed down to pressure $P_4+b$. Compartment 3' feeds in turn compartment 3. For this purpose, compartment 3 is provided with a tight cover 113 communicating with compartment 3' through a tube 114.

By means of a suitable arrangement of diaphragms and valves 5, 40, 36, 37, the air is further depressed from pressure $P_4+b$ down to $P_4-b$.

Moreover, the tube 44' and the nozzle 45' may be eliminated since the air flow from the compartment 3' is normally ensured through compartment 3. Otherwise, the apparatus remains unchanged. In particular, as previously, the control pressure is picked up in compartment 3.

It is to be understood that the invention is in no way limited to the examples described and shown and that it can be modified within large limits without departing from the spirit of the invention.

In particular, the automatic switching means provided to communicate the capillary tube with both the derivations 51, 51' may be substituted for by hand-actuated switching means to obturate said tube, so as to maintain chamber 4 at pressure $P_4$.

Furthermore, pipe 44' and the nozzle 45' may be eliminated, even when the compartments 3 and 3' are both fed directly from the cabin, by providing tap 49 with means to limit its degree of closure, the air exhaust from the compartment 3' then taking place through the tap, throttling 48, pipes 47, 44, nozzle 45 and pipe 29.

What is claimed is:

1. In an aircraft cabin control system having means for supplying air under pressure to said cabin, the latter being provided with an outlet controlled by a pilot pressure-sensitive outflow valve, a mechanism for controlling said pilot pressure comprising, in combination, a main control pressure chamber having two deformable wall portions and two auxiliary pressure chambers each separated from said main chamber by one of said deformable wall portions and having a connection with said cabin, adjustable valve means associated with said deformable wall portions for controlling air flow from said cabin through said connections into said auxiliary chambers in response to cabin pressure and control chamber pressure variations, said valve means being adjusted so as to close one of said auxiliary chambers under the effect of a cabin pressure different from that which will cause the closing of the other auxiliary chamber to thereby create a pressure differential between said auxiliary chambers, a duct system to interconnect said auxiliary chambers, means to connect the interconnection between said auxiliary chambers with outside, two flow restricting means of equivalent action in said interconnection, adjustable means for controlling the rate of flow between said flow restricting means, a capillary tube communicating at one end with said control pressure chamber and means to connect the other end of said capillary tube selectively with either one of two points of said interconnection located on either side of said adjustable control means between the same and said flow restricting means or with both of said points to thereby determine slow air flow through said capillary tube in either direction or interruption of such air flow, the auxiliary chamber having the lower pressure therein being in communication with said outflow valve to feed the same with said pilot pressure.

2. A pilot pressure controlling mechanism according to claim 1, further comprising hand-controlled means to connect selectively the said other end of said capillary tube with one of said points of said interconnection, and means responsive to the cabin pressure to establish simultaneous communication between said capillary tube and both of said interconnection points in cooperation with said hand-controlled means, whatever may be the prior communication established by the latter.

3. A pilot pressure controlling mechanism according to claim 2, further comprising a switching chamber communicating with said capillary tube end, a first and a second duct to establish a communication between said switching chamber and said interconnection points, respectively, a tilting arm articulated in said chamber towards its mid-point and provided at both ends with valve members adapted to close selectively one of said ducts, elastic means to urge said tilting arm continuously towards a position in which it closes said first duct, a hand-controlled mechanism operatively connected with said tilting arm to bring the same from said position into another one, in which it closes said second duct and an aneroid interposed in said mechanism to vary its length to thereby bring said tilting arm from either one of said closing positions into an intermediate position in which it lets both of said ducts open for a given pressure in said switching chamber.

4. A pilot pressure controlling mechanism according to claim 3, wherein said ducts, tilting arm, hand-controlled means and aneroid are so arranged that the latter further acts as regulating means to balance slight variations of the pressure in said switching chamber by varying the position of said tilting arm to change the relative degrees of opening of said ducts.

5. A pilot pressure controlling mechanism according to claim 1, wherein said valve means are so adjusted that the pressure in said control chamber be continuously the arithmetical mean between the pressures in said auxiliary chambers.

6. A pilot pressure controlling mechanism according to claim 1, wherein said auxiliary chambers are further interconnetced through a pipe provided with two nozzles, a duct connecting a point of said pipe located between said nozzles with outside.

7. A pilot pressure controlling mechanism according to claim 1, wherein said valve means is provided with means to limit its degree of closure and wherein a duct provided with a nozzle connects said second auxiliary chamber with outside.

8. A pilot pressure controlling mechanism according to claim 1, further comprising a limiting valve interposed between outside and the outflow valve, whereby the difference between the pilot and external pressures and hence between the cabin and external pressures is limited to a predetermined value.

9. A pilot pressure controlling mechanism according to claim 1 further comprising a selector valve adapted to connect selectively said outflow valve either with said cabin or with one of said auxiliary chambers.

10. A pilot pressure controlling mechanism according to claim 9, further comprising a limiting valve interposed between outside and a point of the interconnection of said auxiliary chambers located between said one chamber and said flow restricting means, wherein said selector valve is further adapted to selectively establish or interrupt the communication between said outflow valve and outside through said limiting valve, while connecting said regulating unit with said cabin.

11. A pilot pressure controlling mechanism according to claim 10, wherein said selector valve is further adapted to interrupt communication betwen said outflow valve and said second chamber.

References Cited in the file of this patent
UNITED STATES PATENTS

| | | |
|---|---|---|
| 2,513,332 | Kemper | July 4, 1950 |
| 2,669,175 | Fischer | Feb. 16, 1954 |